US010516482B1

(12) United States Patent
Schmogrow

(10) Patent No.: US 10,516,482 B1
(45) Date of Patent: Dec. 24, 2019

(54) PHYSICAL LAYER ROUTING AND MONITORING

(71) Applicant: Google LLC, Mountain View, CA (US)

(72) Inventor: Rene Schmogrow, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/271,472

(22) Filed: Feb. 8, 2019

(51) Int. Cl.
*H04B 10/25* (2013.01)
*H04B 10/07* (2013.01)
*H04B 10/27* (2013.01)

(52) U.S. Cl.
CPC ............ *H04B 10/27* (2013.01); *H04B 10/07* (2013.01); *H04B 10/25* (2013.01)

(58) Field of Classification Search
CPC combination set(s) only.
See application file for complete search history.

(56) References Cited

U.S. PATENT DOCUMENTS

| 8,200,084 | B2* | 6/2012 | Bernstein | H04J 14/0227 370/217 |
| 8,238,749 | B2* | 8/2012 | Bernstein | H04Q 11/0062 398/69 |
| 9,571,223 | B2* | 2/2017 | Lee | H04J 14/0227 |
| 2002/0176131 | A1* | 11/2002 | Walters | G06F 8/65 398/58 |
| 2002/0191247 | A1 | 12/2002 | Lu et al. | |
| 2003/0219198 | A1 | 11/2003 | Zhou | |
| 2004/0042796 | A1* | 3/2004 | Con-Carolis | H04J 14/0227 398/83 |
| 2011/0318004 | A1* | 12/2011 | Bruno | H04Q 11/0062 398/45 |
| 2012/0201541 | A1* | 8/2012 | Patel | H04J 14/0212 398/58 |
| 2012/0251097 | A1* | 10/2012 | Elmardini | H04B 10/032 398/5 |
| 2013/0022352 | A1* | 1/2013 | Yamashita | H04J 14/0212 398/34 |

(Continued)

OTHER PUBLICATIONS

Chatterjee, Bojoy Chand, et al., "Routing and Spectrum Allocation in Elastic Optical Networks: A Tutorial" IEEE Communication Surveys & Tutorials, vol. 17, No. 3, pp. 1776-1800, May 11, 2015.

*Primary Examiner* — Omar S Ismail
(74) *Attorney, Agent, or Firm* — Lerner, David, Littenberg, Krumholz & Mentlik, LLP

(57) ABSTRACT

Systems and methods for allocating optical circuits on optical mesh networks are disclosed herein. For example, the disclosed methods include identifying a new circuit to be added to a mesh optical network and identifying a set of potential paths for the new circuit. For each optical link in each identified potential path, costs are determined for a plurality of frequency slots of allocating the new circuit to a potential path including the optical link. The cost of allocating a given frequency slot on a given optical link is determined in part based on the lengths of optical circuits that can traverse the given optical link using that frequency slot. Total cost values are calculated for allocating available frequency slots over each of the identified potential paths, and one of the identified potential paths and one or more of the available frequency slots are allocated for the new circuit.

20 Claims, 7 Drawing Sheets

(56) References Cited

U.S. PATENT DOCUMENTS

| | | | | |
|---|---|---|---|---|
| 2014/0355454 A1* | 12/2014 | Serban | .............. | H04W 24/08 |
| | | | | 370/245 |
| 2015/0163009 A1* | 6/2015 | Fu | .................. | H04J 14/0257 |
| | | | | 398/48 |
| 2015/0333824 A1* | 11/2015 | Swinkels | ............ | H04J 14/0227 |
| | | | | 398/25 |
| 2015/0333861 A1* | 11/2015 | Fu | .................. | H04Q 11/0062 |
| | | | | 398/79 |
| 2016/0105252 A1* | 4/2016 | Bouda | .............. | H04J 14/0257 |
| | | | | 398/49 |
| 2016/0219351 A1* | 7/2016 | Buchali | ............. | H04Q 11/0005 |
| 2017/0134114 A1* | 5/2017 | Boertjes | ............ | H04J 14/0257 |
| 2017/0142505 A1* | 5/2017 | Maamoun | ......... | H04Q 11/0066 |

\* cited by examiner

PHYSICAL LAYER ROUTING AND MONITORING

BACKGROUND

In a communications network, information (such as a data stream or data packets) may be transmitted from a source to a destination. The information may be transmitted as a data flow, which carries the information between the source and the destination along a path. The source and the destination may be nodes in the network. A node represents a device that communicates with the network and through which information may pass, originate, and/or terminate. The nodes may be, for example: computing devices such as personal computers, phones, or tablets; servers such as email servers, data servers, or web servers; routers; switches; reconfigurable optical add drop multiplexers (ROADM); and other networking devices. The data flows may be transmitted over paths in the network. Each path is made up on of one or more links (or edges). A link or edge refers to a connection between two adjacent nodes. Each link is associated with a capacity or bandwidth, which represents the amount of data that the link is capable of carrying at any given time.

As more nodes, data flows, and links are added to the network, it becomes increasingly complicated to allocate paths for different data flows. Choosing the appropriate amount of data to allocate to a given link and balancing the bandwidth of the links in the network with the desire to route each data flow in a fast, efficient manner are difficult problems for traffic engineering systems.

SUMMARY

According to one aspect, the disclosure relates to a computer-implemented method. The method includes identifying a new circuit to be added to a mesh optical network having a plurality of optical links. Each optical circuit includes a source node and a destination node between which an optical signal carried over the optical circuit is not converted to an electrical signal. The method also includes identifying a set of potential paths for the new circuit through the mesh optical network. For each optical link in each identified potential path, respective costs are determined for a plurality of frequency slots of allocating the new circuit to a potential path including the optical link. The cost of allocating a given frequency slot on a given optical link is determined in part based on the lengths of optical circuits that can traverse the given optical link using that frequency slot. The method further includes calculating total cost values for allocating available frequency slots over each of the identified potential paths for the new circuit based on the costs determined for the frequency slots for each optical link along the potential paths. One of the identified potential paths and one or more of the available frequency slots are selected for the new circuit based on the calculated total cost values, and routing and spectrum allocation instructions based on the selected path and the selected one or more frequency slots are communicated to a plurality of nodes in the network to implement the new circuit.

In some implementations, selecting one or more of the available frequency slots for the new circuit comprises selecting a plurality of adjacent frequency slots. In some implementations, selecting one of the potential paths and the one or more frequency slots includes selecting the one or more frequency slot over the potential paths that have the lowest calculated total cost value.

In some implementations, the method includes assigning a higher cost to frequency slots that are available for longer optical circuits and a lower cost to frequency slots that are only available for shorter optical circuits. In some implementations, the cost of allocating one frequency slot over a given optical link to a new circuit differs from the cost of allocating a different frequency slot over the given optical to the new circuit based on the locations of the frequency slots in the electromagnetic spectrum.

In some implementations, after selecting one of the identified potential paths and one or more of the available frequency slots for the new circuit based on the calculated total cost values, the method includes calculating updated costs for frequency slots over a plurality of optical links in the optical mesh network based on the selection. In some implementations, the updated costs are calculated only for links included in the selected identified potential paths.

In some implementations, identifying a set of potential paths further includes identifying a subset of paths having a path length within a configured percentage of a smallest path length identified between the source node and the destination node, wherein path length is measured in terms of total optical fiber length along the respective paths.

According to another aspect, the disclosure relates to a non-transitory computer-readable medium storing instructions that, when executed by one or more processors, cause the one or more processors to carry out a method. The method includes identifying a new circuit to be added to a mesh optical network having a plurality of optical links, where each optical circuit includes a source node and a destination node between which an optical signal carried over the optical circuit is not converted to an electrical signal. The method also includes identifying a set of potential paths for the new circuit through the mesh optical network. For each optical link in each identified potential path, respective costs are determined for a plurality of frequency slots of allocating the new circuit to a potential path including the optical link. The cost of allocating a given frequency slot on a given optical link is determined in part based on the lengths of optical circuits that can traverse the given optical link using that frequency slot. The instructions further cause the one or more processors to calculate total cost values for allocating available frequency slots over each of the identified potential paths for the new circuit based on the costs determined for the frequency slots for each optical link along the potential paths, and to select one of the identified potential paths and one or more of the available frequency slots for the new circuit based on the calculated total cost values. Routing and spectrum allocation instructions based on the selected path and the selected one or more frequency slots are then communicated to a plurality of nodes in the network to implement the new circuit.

In some implementations, selecting one or more of the available frequency slots for the new circuit comprises selecting a plurality of adjacent frequency slots. In some implementations, selecting one of the potential paths and the one or more frequency slots includes selecting the one or more frequency slot over the potential paths that have the lowest calculated total cost value.

In some implementations, the one or more processors assign a higher cost to frequency slots that are available for longer optical circuits and a lower cost to frequency slots that are only available for shorter optical circuits. In some implementations, the cost of allocating one frequency slot over a given optical link to a new circuit differs from the cost of allocating a different frequency slot over the given optical to the new circuit based on the locations of the frequency slots in the electromagnetic spectrum.

In some implementations, the instructions, when executed by the one or more processors, cause the one or more processors to, after selecting one of the identified potential paths and one or more of the available frequency slots for the new circuit based on the calculated total cost values, calculate updated costs for frequency slots over a plurality of optical links in the optical mesh network based on the selection. In some implementations, the updated costs are calculated only for links included in the selected identified potential paths.

According to another aspect, the disclosure relates to a system. The system includes an optical mesh network including a plurality of nodes interconnected by optical links a a memory for storing a representation of the optical mesh network, and a processor. The processor is configured to identify a new circuit to be added to a mesh optical network having a plurality of optical links. Each optical circuit includes a source node and a destination node between which an optical signal carried over the optical circuit is not converted to an electrical signal. The processor is further configured to identify a set of potential paths for the new circuit through the mesh optical network based on the stored representation, and for each optical link in each identified potential path, determine respective costs for a plurality of frequency slots of allocating the new circuit to a potential path including the optical link. The cost of allocating a given frequency slot on a given optical link is determined in part based on the lengths of optical circuits that can traverse the given optical link using that frequency slot The processor is further configured to calculate total cost values for allocating available frequency slots over each of the identified potential paths for the new circuit based on the costs determined for the frequency slots for each optical link along the potential paths. The processor is also configured to select one of the identified potential paths and one or more of the available frequency slots for the new circuit based on the calculated total cost values and communicate routing and spectrum allocation instructions based on the selected path and the selected one or more frequency slots to a plurality of nodes in the network to implement the new circuit.

In some implementations, selecting one or more of the available frequency slots for the new circuit comprises selecting a plurality of adjacent frequency slots. In some implementations, the processor is configured to assign a higher cost to frequency slots that are available for longer circuits and a lower cost to frequency slots that are only available for shorter circuits. In some implementations, the cost of allocating one frequency slot over a given optical link to a new circuit differs from the cost of allocating a different frequency slot over the given optical to the new circuit based on the locations of the frequency slots in the electromagnetic spectrum. In some implementations, the processor is configured to, after selecting one of the identified potential paths and one or more of the available frequency slots for the new circuit based on the calculated total cost values, calculate updated costs for frequency slots over a plurality of optical links in the optical mesh network based on the selection.

BRIEF DESCRIPTION OF THE DRAWINGS

The following figures are included to illustrate certain aspects of the implementations, and should not be viewed as exclusive implementations. The subject matter disclosed is capable of considerable modifications, alterations, combinations, and equivalents in form and function, as will occur to those skilled in the art and having the benefit of this disclosure.

DETAILED DESCRIPTION

Figure 1:
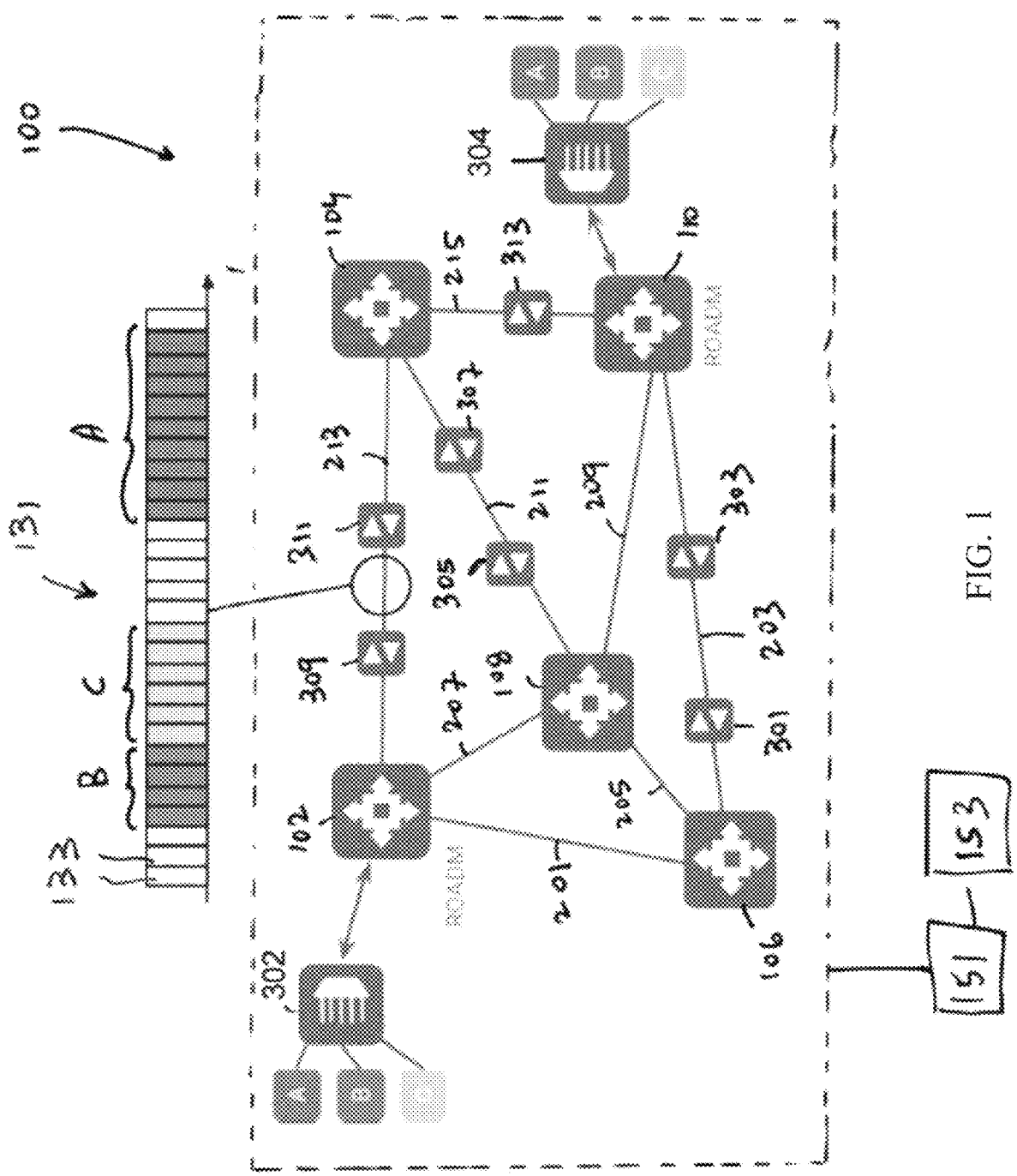
FIG. 1 illustrates an example mesh optical network, according to implementations disclosed herein.

Implementations disclosed are directed to a method and apparatus for routing and spectrum allocation in optical mesh networks. The method and apparatus can reduce blocking (or accumulation periods) of data/information communicated using existing paths between a source and a destination in the mesh optical network. Implementations disclosed can also reduce a probability of blocking data/information in future communication paths that may be implemented between a source and a destination in an optical mesh network.

The source and the destination may be nodes in the network. A node represents a device that communicates with the network and through which information may pass, originate, and/or terminate. The nodes may be, for example: computing devices such as personal computers, phones, or tablets; servers such as email servers, data servers, or web servers; routers; switches; reconfigurable optical add drop multiplexers (ROADM); and other networking devices.

The data flows may be transmitted over paths in the network. As used herein, a connection between two nodes is referred to as a link, or with respect to a graph representation of the network, an "edge," and one or more connected links or edges form a network path connecting a source and a destination. For purposes of discussion herein, the transmission medium of the mesh network is assumed to be fiber optic cable, and the network is referred to a mesh optical network. However, implementations are not limited in this regard.

In a mesh optical network, information (or data) is transmitted along a path connecting the source node and the destination node using a signal that is modulated onto one or more carrier waves that form an optical channel or circuit. The source node and the destination node may be considered end nodes of the network path connecting the source and destination nodes to each other. At the source node and the destination node, the optical signal is formed via electrical-to-optical conversion and recovered via optical-to-electrical conversion, respectively. In between a source node and a destination node, an optical signal is transmitted via the optical channel without any optical-to-electrical-to-optical (OEO) conversion or regeneration. In some instances, the optical channel may travel through one or more intermediate nodes and the edges or links that connect the intermediate nodes. An intermediate node does not perform OEO conversion or regeneration on the received optical channel, and functions merely to direct (and in some cases amplify) the received optical signal onto the edge or link connected to the subsequent node (another intermediate node or a destination node) along the path.

In some implementations, the optical channel occupies one or more integer number of contiguous or adjacent frequency slots of a frequency spectrum. In some implementations, one or more of the frequency slots may be located in separate (i.e., non-adjacent) portions of the frequency spectrum. In some implementations, the width of each frequency slot of the spectrum is around 3.125 GHz. Accordingly, the number of frequency slots assigned to the optical channel depends on the bandwidth required by the optical channel.

FIG. 1 illustrates an example mesh optical network 100, according to implementations disclosed herein. As illustrated, the mesh optical network 100 includes a first node 102, a second node 104, a third node 106, a fourth node 108, and a fifth node 110. In the following example, the first node 102 serves as a source node and is referred to as the source node 102 in the discussion below. The fifth node 110 serves as a destination node and is referred to as the destination node 110 in the discussion below. The second node 104, the third node 106, and the fourth node 108 serve as intermediate nodes. In the example network 100, the first node 102, the second node 104, the third node 106, the fourth node 108, and the fifth node 110 may be or include a reconfigurable optical add drop multiplexer (ROADM). The first node 102 and the third node 106 are connected to each other via a first edge 201. The third node 106 and the fifth node 110 are connected to each other via a second edge 203. The third node 106 and the fourth node 108 are connected to each other via a third edge 205. The first node 102 and the fourth node 108 are connected to each other via a fourth edge 207. The fourth node 108 and the fifth node 110 are connected to each other via a fifth edge 209. The second node 104 and the fourth node 108 are connected to each other via a sixth edge 211. The first node 102 and the second node 104 are connected to each other via a seventh edge 213. The second node 104 and the fifth node 110 are connected to each other via an eighth edge 215. Each of the first edge 201, the second edge 203, the third edge 205, the fourth edge 207, the fifth edge 209, the sixth edge 211, the seventh edge 213, and the eighth edge 215 comprise one or more fiber optic cables.

Some of the edges include one or more optical line amplifiers connected in series with each other and with the nodes for regenerating the optical signal travelling along the corresponding edge. For instance, the second edge 203 includes a first optical line amplifier 301 connected in series with a second optical line amplifier 303. Each of the first optical line amplifier 301 and the second optical line amplifier 303 are configured to regenerate or amplify the optical channels(s) traveling along the second edge 203. Similarly, the sixth edge 211 includes a third optical line amplifier 305 connected in series with a fourth optical line amplifier 307, the seventh edge 213 includes a fifth optical line amplifier 309 connected in series with a sixth optical line amplifier 311, and the eight edge 215 includes a seventh optical line amplifier 313. It should be noted that implementations are not limited to the network configuration in FIG. 1, and that the number of edges, nodes, and/or the optical line amplifiers in the network 100 may be increased or decreased as per requirement.

In the example network 100, and as illustrated, a plurality of optical channels A, B, and C are transmitted between the source node 102 and the destination node 110. The optical channels may be provided to the source node 102 using an input device (e.g., a multiplexing device) 302. The optical channels A, B, and C may be output from the destination node 110 using an output device (e.g., a demultiplexing device) 304. The optical channels A, B, and C may be used to transmit information between the source node 102 and the destination node 110. For the purposes of discussion herein, an "optical channel", or "optical circuit", refers to an end-to-end (e.g., source node to destination node) optical signal that is modulated onto one or more optical carriers without any optical to electrical to optical (OEO) conversion between the source node and the destination node. In other words, any optical to electrical to optical (OEO) conversion or regeneration (other than amplification) of the optical channel occurs only at the end nodes, which, in this case, may be the source node 102 and the destination node 110.

FIG. 1 also illustrates an example frequency spectrum allocation 131 along the seventh edge 213. As illustrated, the optical channels A, B, and C are spread across multiple frequency slots 133 and each optical channel A, B, and C occupies a different number of frequency slots. As illustrated, optical channel B occupies 3 frequency slots, optical channel C occupies 6 frequency slots, and optical channel A occupies 9 frequency slots. However, implementations are not limited in this regard. In other implementations, two or more optical channels may occupy a same number of frequency slots. In an example, the width of each frequency slot 133 is around 3.125 GHz, though other frequency (e.g., between about 3.0 to 5.0 GHz) widths may be used. At different regions of the optical spectrum, the bit rate supportable by the same channel width can vary. Accordingly, the number of frequency slots allocated to a given optical channel will vary both based on the bandwidth required by that channel and the location within the optical spectrum of the frequency slots assigned to the optical channel.

In FIG. 1, frequency slots 133 between adjacent optical channels A and C are unoccupied by an optical channel and are thus considered available for carrying a new optical channel. Similarly, frequency slots 133 after the optical channel A and before the optical channel B are available and may also be used to carry a new optical channel.

As used herein, an optical channel may carry data associated with one or more data flows that travel between common source and destination nodes. Note that the source and destination nodes need not be the original source and final destinations of the flows within the channel; source and destination nodes in this context only refer to the beginning and end of the optical path between which the optical signal is not converted back to an electrical signal for routing or reception.

A network controller 151 controls the operation and configuration of the various components of the network 100. The network controller 151 is communicably coupled to components of the network 100 and may include hardware-based logic or a combination of hardware based logic and software-based logic to execute instructions. The network controller 151 may include logic that may interpret, execute, and/or otherwise process information contained in, for example, a memory 153 communicably coupled to the network controller 151. The information may include computer-executable instructions and/or data used to control the operation of the nodes 102, 104, 106, 108, and 110, optical line amplifiers 301, 303, 305, 307, 309, 311, and 313, input device 302, and output device 304 of the network 100 in order to implement a method for transmitting data from the source node 102 and the destination node 110 via the edges 201, 203, 205, 207, 209, 211, 213, and 215 according to one or more implementations of the present disclosure. The network controller 151 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores. Moreover, the network controller 151 may include a system-on-chip (SoC) or system-in-package (SiP).

Figure 2:
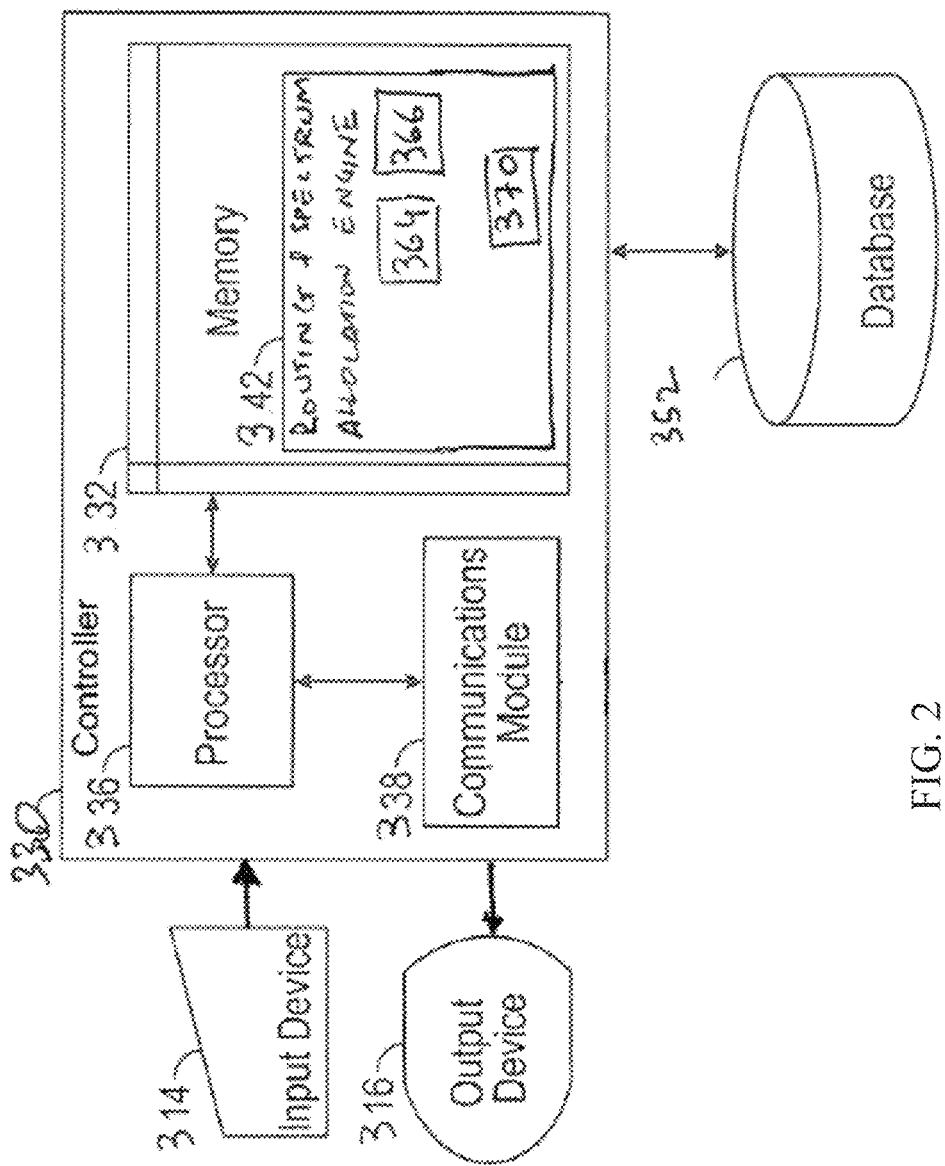
FIG. 2 shows a block diagram of an example controller suitable for use as the network controller shown in FIG. 1.

FIG. 2 shows a block diagram of an example controller 330 suitable for use as the network controller 151 shown in FIG. 1. The controller 330 is configured determine routes for data through a network and to allocate spectrum to such routes on each of the edges connecting nodes of the network. The controller 330 includes a memory 332, a processor 336, and a communications module 338 to transfer data, receive commands, and provide instructions. The memory 332 stores computer executable instructions, which when executed, implement the functionality of a routing and spectrum allocation engine 342. In other implementations, the routing and spectrum allocation engine 342 may be implemented in hardware in the controller 330. In still other implementations, the routing and spectrum allocation engine 342 may be implemented as a combination of hardware and software. The communications module 338, for example, a network interface driver, can be configured to output over a network interface card the output of the routing and spectrum allocation engine 342 to the various nodes of the network the controller 330 manages. The network interface card may be configured for electrical and/or optical communication.

The controller 330 may be coupled to one or more input devices 314 (e.g., a mouse, a keyboard, a touch screen display, and the like) and one or more output devices 316 (e.g., a display, a speaker, and the like). Accordingly, a user may enter commands and queries to controller 330 with the input device 314, and receive graphic and other information from controller 330 via output device 316. In some implementations, the input device 314 and output device 316 can be controlled using a graphic user interface (GUI), enabling a user to have access to the controller 330. In other implementations, the input device 314 and/or the output device 316 may be communicatively connected to the controller 330 through a network. In such implementations, the input device 314 and output device 316 may be the receiver and transmitter, respectively (or collectively the transceiver), of a network interface card. The input device 314 and output device 316 can be utilized by a user to set configuration parameters for the routing and spectrum allocation engine 342, such as the size of spectrum slots, weighting factors (discussed further below), and shortest path selection parameters. In other implementations, configuration parameters may be entered by a user of a remote computing device that communicates with the controller 330 via a network connection or set autonomously or semi-autonomously by a traffic engineering system located within or external to the network being controlled.

A database 352 stores a variety of information for access and processing by the routing and spectrum allocation engine 342. Such information includes, without limitation, routing information (e.g., source and destination nodes), network topology information (including level 1 connectivity information), traffic demand information, current spectrum allocations, and previously calculated costs associated with allocating additional circuits or optical channels to each edge in the network.

The routing and spectrum allocation engine 342 includes a path identification module 364, a cost determination module 366, and a circuit allocation module 370. As used herein, a "module" refers to a cohesive body of software code (or computer executable instructions) or electronic logic blocks configured to carry out a defined function. In other implementations, one or more of the above modules may be combined into a larger module or divided into multiple smaller, more discrete modules, which collectively perform the described functionality. In brief overview, the path identification module 364 is configured to identify suitable paths through the network for new optical circuits. The cost determination module 366 is configured to determine the costs of assigning new optical circuits to the paths identified by the path identification module 364. The circuit allocation module 370 is configured to allocate for a new circuit specific frequency slots across a specific identified path based on the costs determined by the cost determination module 366. Together, these modules operate to carry out the method discussed below in relation to FIG. 3. The functionality of each module will be described further in relation to the various steps of the method shown in FIG. 3.

Figure 3:
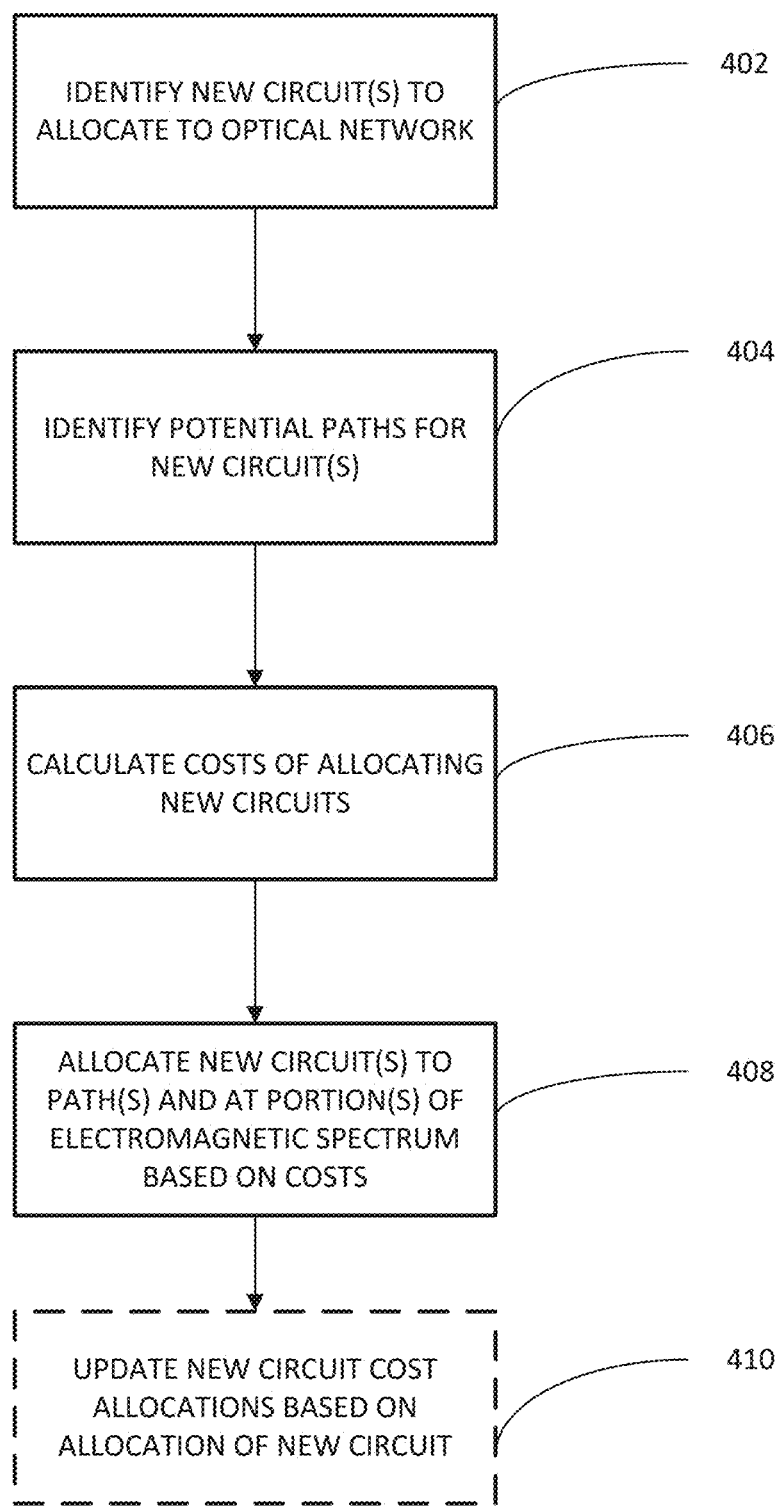
FIG. 3 is a flow chart of an example method of performing routing and spectrum allocation.

FIG. 3 is a flow chart of an example method 400 of performing routing and spectrum allocation. The method 400 may be performed, for example by the controller 330 shown in FIG. 2 or other suitably configured computing device. Methods consistent with the present disclosure may include at least some, but not all, of the steps illustrated in method 400, performed in a different sequence. Furthermore, methods consistent with the present disclosure may include at least two or more steps shown in method 400 performed overlapping in time, or almost simultaneously. Similarly, at least some of the steps illustrated in method 400 may be performed in parallel by different processors, following separate computational threads. For example, each of the separate computational threads may be performed in parallel, and may even be executed in different execution environments, e.g., different virtual machines or containerized environments.

In broad overview, the method 400 includes identifying one or more new circuits to allocate to an optical network (stage 402), identifying potential paths for the new circuits (stage 404), calculating costs of allocating the new circuit(s) to the potential paths (stage 406), and allocating the new circuits to respective paths at respective portions of an electromagnetic spectrum based on the calculated costs (stage 408). The method 400 optionally includes updating new circuit cost allocation cost data based on the allocation of a new circuit to the network (stage 410). Each of the aforementioned stages is described further below. An example execution of the method 400 is then then discussed in relation to FIGS. 4A-4C.

As indicated above, the method 400 includes identifying one or more new circuits to allocate within an optical network. For example, a network controller, such as the controller 330 shown in FIG. 2 or the controller 151 shown in FIG. 1 may receive notification of a new flow to be carried by the network between a source node and destination node between which no circuit has been previously allocated or for which no previously allocated circuit has sufficient available capacity to carry. Similarly, the controller may receive notice that a previously assigned optical channel or circuit is experiencing undue levels of congestion (e.g., due to growth of bandwidth needs of previously allocated flows or failure of one or more nodes or links traversed by the circuit), and a determination has been made that such flows cannot be allocated to any other previously allocated channel. The controller may receive notices or make determinations of the need for the addition of individual new circuits, small batches of new circuits (e.g., on the order of dozens to thousands of circuits), or in large batches of tens of thousands to more than a million circuits, e.g., after a significant network topology change or significant change in network usage. The identification of the circuit(s) to be added includes the identification of the source node and the destination node of the circuit, but does not include any information about any intermediate nodes. As indicated previously, as used herein the terms "source node" and "destination node" do not necessarily correspond to the actual original source computing device and eventual end destination computing device, but instead merely refer to the beginning and end of an uninterrupted optical path (i.e., a path that lacks any OEO conversion) through the network.

After new circuits to be allocated are identified (stage 402), potential paths for the new circuit(s) are identified (stage 404). The potential paths may be identified, in some implementations, by the path identification module 364 of the controller 330 shown in FIG. 2. In various implementations path identification (stage 402) can be carried out for each new circuit in one or two phases. In one implementation, the first phase includes identifying a set of K shortest paths between the source and destination node of a given new circuit, where K is a positive integer. The K shortest paths between two end nodes can be determined based on the distance travelled by light in each path connecting a pair of nodes (e.g., total fiber length) in the network. In contrast to most shortest-path determinations in packet-switched networking, given that the optical signal of a circuit need not be processed at each intermediate node, the shortest path need not be the path traversing the fewest number of intermediate nodes (though it often is). Instead, the method determines the shortest path between a pair of nodes based on the length of optical fiber travelled between the nodes. In some situations, a path with more intermediate nodes may in fact be shorter than a path that has fewer intermediate nodes. In some implementations, the set of K shortest paths is determined using Yen's algorithm.

In determining the set of K shortest paths, in some implementations the controller only takes into account the existence of layer 1 connections between nodes. That is, in such implementations, the shortest path determination ignores current allocations or available bandwidth on such layer 1 connections, leaving such information to be taken into account in the cost calculation and path selection stages discussed further below. In addition, in some implementations, the K shortest path determination assumes a fixed layer 1 topology (i.e., where no new layer 1 links may be added). In some implementations, the k shortest path determination includes edges and/or nodes that have been planned, but have not yet been built.

In the optional second phase, the set of K shortest paths is down-selected to a set of N shortest paths, where N is a positive integer less than K. The down-selection is achieved by first selecting the absolute shortest path identified in the set of K shortest paths, and then selecting all other paths in the set of K paths that are within some threshold length variation from the length of the identified shortest path. For example, the set of N paths may include all paths that have a length within 5%, 10%, 15%, or 20% (or any percentage in between, as well as percentages below 5% and above 20%) of the shortest path. The percentage threshold as well as the value of K may be parameters that are configured by a traffic engineering system or by a system administrator; for example, using the input device 314 of the controller 330. In some implementations, the down-selection phase may be omitted, and the full set of K shortest paths may be evaluated in later stages of the method 400.

The method 400 further includes calculating costs of allocating the new circuit(s) to potential paths (stage 406). This stage (stage 406) may be calculated before or after the set of potential paths for a new circuit have been identified (stage 404). Pre-computing costs across all potential paths may result in increased and potentially unnecessary processing, but may lead to faster path selection after potential paths are identified. On the other hand, waiting for identification of potential paths before calculating allocation costs may require less processing, but may introduce delays in allocation of paths. In some implementations, the cost calculation stage (stage 406) can be carried out by the cost determination module 366 of the routing and spectrum allocation engine 342.

In general, the cost calculation process assigns higher costs to paths that include edges or links that have available frequency slots that can be used in more and longer paths than for paths that include edges with frequency slots that are only available for fewer, shorter paths. That is, frequency slots that can be used in more paths, longer paths, or more, longer paths are viewed as having higher flexibility and thus higher utility, and paths that use such frequency slots are deemed higher cost to preserve their usage for possible usage for other paths. The cost of a frequency slot along an edge that is based on the length of the optical circuits that frequency slot can be used for (in terms of number of nodes traversed) is referred to herein as an adjacency cost. That is, frequency slots that are available for longer circuits are said to have a higher adjacency cost that frequency slots that are only available for shorter circuits. For example, a frequency slot on an edge that can be used in an optical circuit that includes eight adjacent or contiguous edges or links may be assigned an adjacency cost that is higher than a frequency slot than can only be used for an optical circuit that includes four adjacent of continuous edges or links.

The allocation cost calculation stage (stage 406) includes two phases. First, a cost is determined for allocating each frequency slot of each edge of each potential path (or all edges if costs are pre-computed before paths are identified). Next, a total cost of each potential path (route and spectrum allocation) is calculated based on the calculated edge costs. The total cost calculation may take into account additional cost factors, such as costs associated with inherent spectral efficiencies or inefficiencies, and costs associated with specific links (e.g., due to geography or amplification-induced noise in longer links) or specific portions of the spectrum (e.g., costs for using reserved frequency slots).

As indicated above, first a cost is calculated for assigning each frequency slot along each edge under consideration. In post-path identification cost calculation implementations of stage 406, an edge is under consideration if the edge is part of a potential path identified for a new circuit. In pre-path identification implementations of stage 406, all edges are considered under consideration. The result of the calculation for an edge is a one-dimensional array of costs per frequency slot along that edge.

Frequency slot costs for the arrays are determined based on routes and spectrum allocations of the previously assigned paths in the network. Frequency slots on an edge that are already assigned to other paths are assigned an infinite cost along that edge, as they are not to be reallocated to another circuit. For each available frequency slot of a given edge, the total cost of including that frequency slot of that edge in a new circuit is based on the sum of the lengths (in terms of number of nodes traversed) of the existing paths that could, but do not currently traverse that edge in that frequency slot. In implementations in which all frequency slots of all edges are weighted equally, the cost is simply the sum of such lengths. In implementations in which differently frequency slots or different edges are assigned different weights, the value of each hop within each frequency slot along each of the paths may be assigned a different value in the summation. For instance, higher weights may be assigned to frequency slots of edges of a network that travel through certain geographical environments (e.g., mountains, subsea, or other hard to access terrain) or that carry high priority, sensitive information, or critical information. These "artificially" high costs will reduce communication via these edges and thus reduce the utilization of the portions of the network including these edges. By reducing network utilization, a reduced amount of traffic travels in these portions of the network, and availability of these edges for communicating information is increased.

Figure 4A:
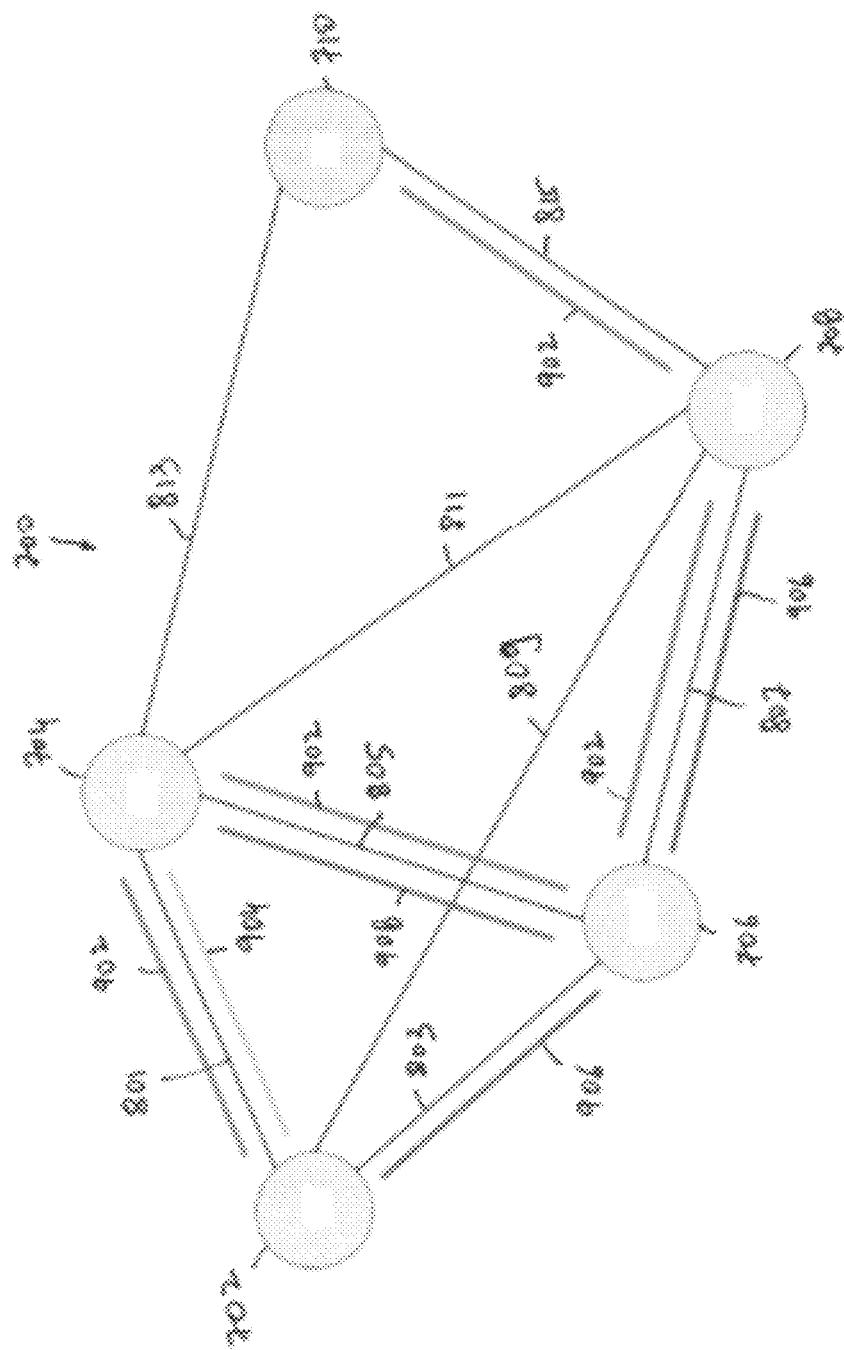
FIGS. 4A-4C illustrate various aspects of calculating edge costs used in allocating a new circuit to an optical mesh network.
Figure 4B:
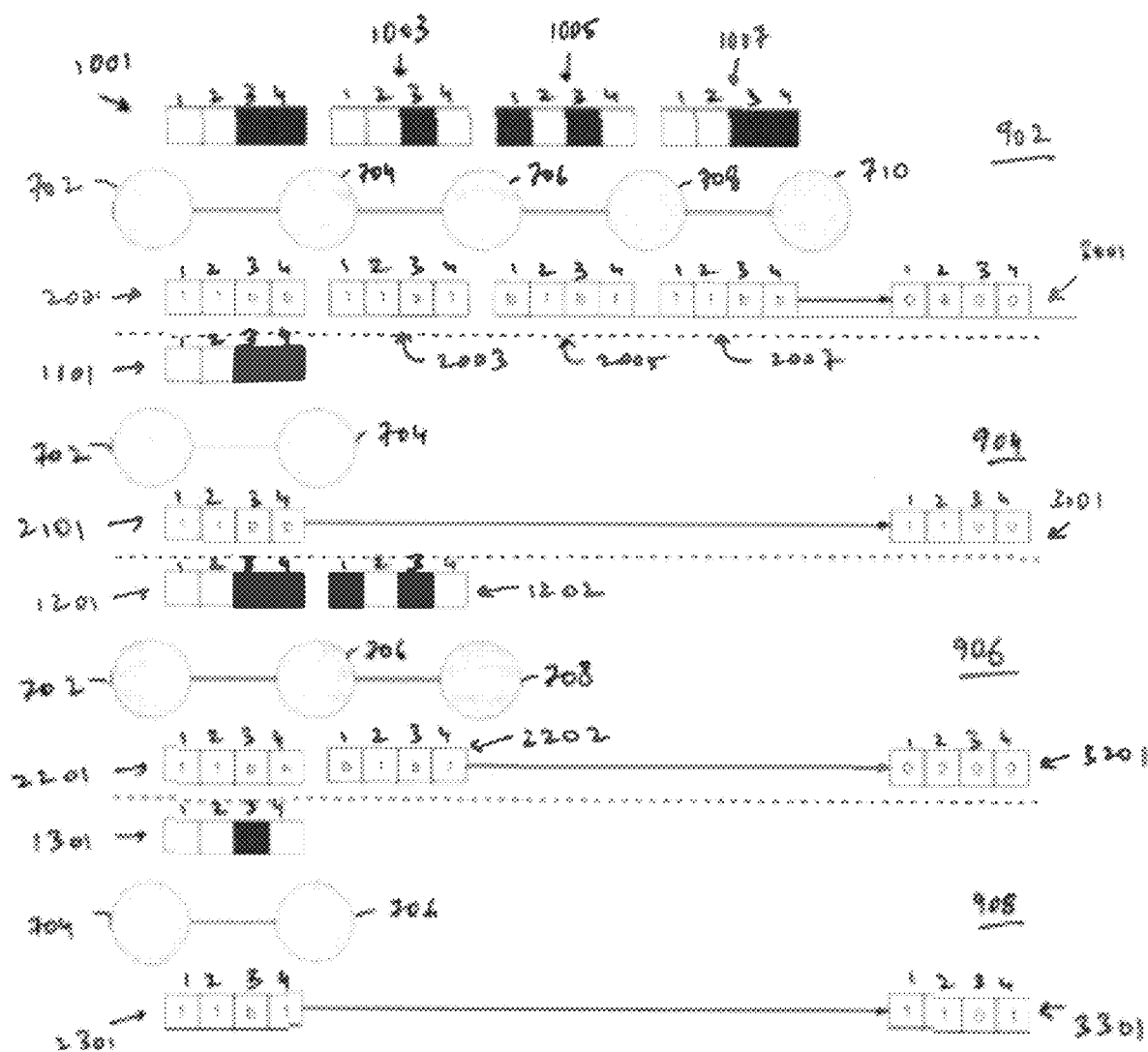
Figure 4C:
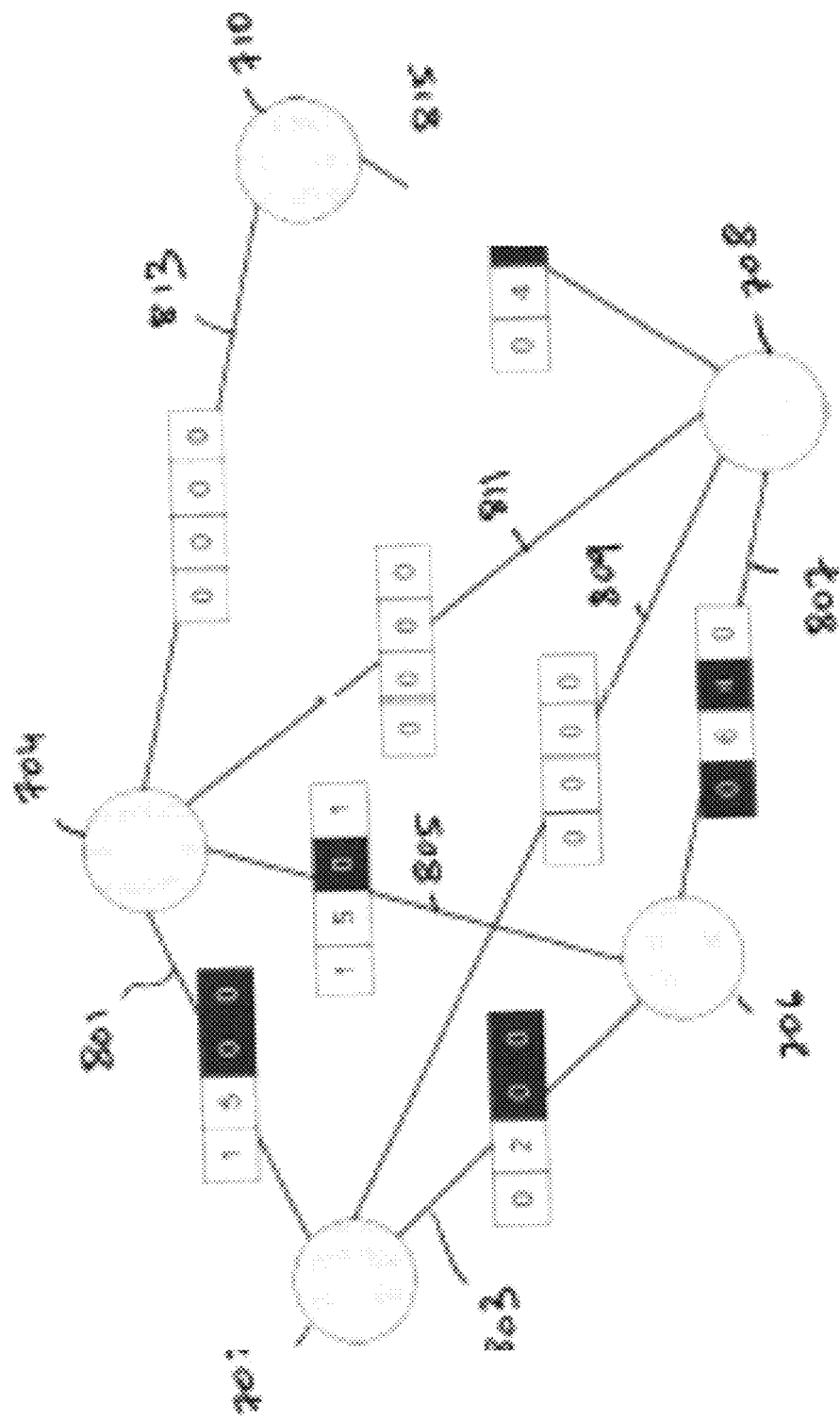
Figure 5:
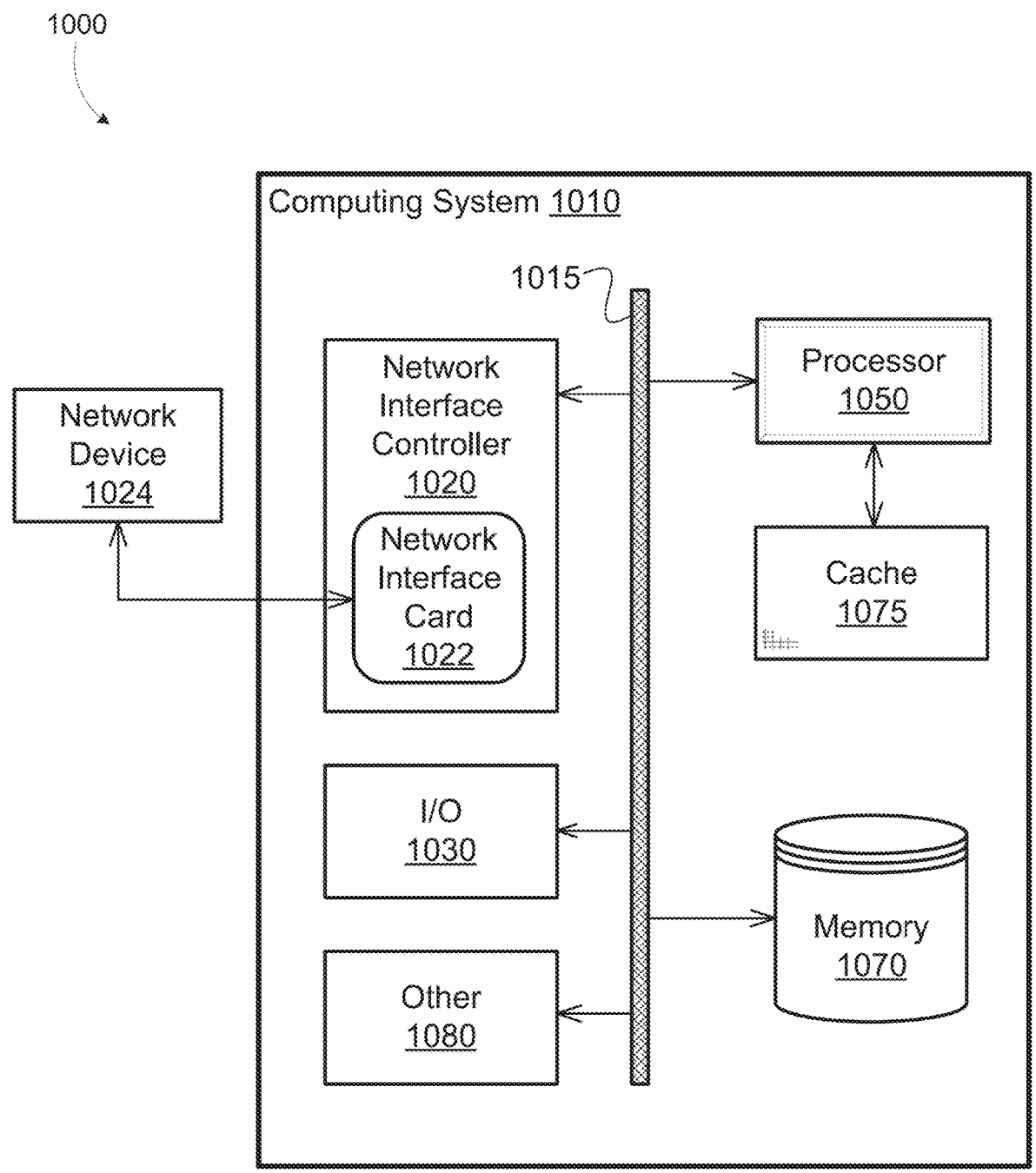
FIG. 5 is a block diagram of an example computing system that may be employed to implement elements of the systems and methods described and illustrated herein.

An example of this edge cost calculation is shown in FIGS. 4A-4C. FIG. 4A illustrates an example mesh optical network 700 for which edge cost arrays will be calculated. The mesh optical network 700 includes a first node 702 ("Node A 702"), a second node 704 ("Node B 704"), a third node 706 ("Node C 706"), a fourth node 708 ("Node D 708"), and a fifth node 710 ("Node E 710") interconnected to each other. A first edge 801 ("Edge AB 801") connects the Node A 702 to Node B 704. A second edge 803 ("Edge AC 803") connects the Node A 702 to Node C 706. A third edge 805 ("Edge BC 805") connects Node B 704 to Node C 706. A fourth edge 807 ("Edge CD 807") connects Node C 706 to Node D 708. A fifth edge 809 ("Edge AD 809") connects Node A 702 to Node D 708. A sixth edge 811 ("Edge BD 811") connects Node B 704 to Node D 708. A seventh edge 813 ("Edge BE 813") connects the Node B 704 to Node E 710. An eighth edge 815 ("Edge DE 815") connects Node D 708 to Node E 710. The mesh optical network 700 includes 4 different optical channels or circuits. A first circuit 902 traverses a path that connects the Node A 702 to Node E 710 via Node B 704, Node C 706, and Node D 708. With respect to first circuit 902, Node A 702 and Node E 710 may be referred to as end nodes of the path including nodes 702-704-706-708-710. Nodes B, C, and D serve merely to passively forward the optical signal along that path without any OEO conversion. A second circuit 904 likewise traverses a path that connects Node A 702 to Node B 704. A third circuit 906 traverses a path that connects Node A 702 to Node D 708 via Node C 706. A fourth circuit 908 traverses a path that connects Node B 704 to Node C 706. The number of nodes, edges, and circuits shown is merely for illustrative purposes. An actual network may have tens, hundreds, or thousands of nodes and tens of thousands to millions (or more) of edges and circuits.

For the sake of explanation, it is assumed that the frequency spectrum available in the network is divided up into four frequency slots or "slices". In actual implementations, the spectrum may be divided into dozens or more slices depending on frequency slot or slice size.

FIG. 4B shows a first step in calculating edge cost arrays for the optical network 700. As shown in FIG. 4B, each existing circuit is evaluated to determine a cost contribution to each frequency slot. For each circuit, FIG. 4B shows each node and each edge traversed by the circuit. For each edge of each circuit, the FIG. 4B shows the availability of each frequency slot, and a corresponding cost array. For example, for the first circuit 902, FIG. 4B shows Node A 702, Node B 704, Node C 706, Node D 708, and Node E 710 connected by Edge AB 801, Edge BC 805, Edge CD 807, and Edge DE 815. Spectrum availability charts 1001, 1003, 1005, and 1007 are shown for each of the respective edges. In each spectrum availability chart, a white box represents an available slot, whereas a black box represents an unavailable slot. Accordingly, in cost arrays 2001, 2003, 2005, and 2007, corresponding cost values are represented with each frequency slot being assigned a value of "1" if it is currently unallocated and a value of "b", representing $-\infty$, if the frequency slot is already allocated. In more complex examples, where certain frequency slots or edges are weighted differently than other edges or slots (as described above), the values entered into the cost arrays 2001, 2003, 2005 and 2007 for previously unallocated frequency slots may vary by, e.g., adding the weighting factor, w, assigned to each frequency slot of each edge to the value "1", such that the value in each position of each cost array equals $1+w_j$ or $1*w_j$, where j represents a given edge, frequency slot pairing. Finally, a total path cost array 3001 is shown for path 902 which sums the individual edge cost arrays 2001, 2003, 2005 and 2007, rounding negative values to 0. A similar process is used to calculate total path cost arrays 3101, 3201, and 3301 for the second through fourth circuits 904, 906, and 908.

Using the total path cost arrays 3001, 3101, 3201, and 3301, final edge cost arrays for each edge are calculated, as shown in FIG. 4C. The final edge costs are calculated for a given edge by setting the cost for any already allocated frequency slot to $\infty$ (FIG. 4C shows such frequency slots in black) and setting the total cost of each unallocated slot to the sum of the costs for that frequency slot of all existing circuits that traverse that edge. Consider, for example, Edge AB 801. As shown in FIG. 4A, Edge AB is traversed the first circuit 902 and the second circuit 904. As shown in FIG. 4B, the first circuit 902 has a total path cost array of [0, 4, 0, 0], and the second circuit 904 has a total path cost array of [1, 1, 0, 0]. FIG. 4B further shows that frequency slots 3 and 4 are previously occupied. Accordingly, as shown in FIG. 4C, the final edge cost array 822 for Edge AB 801 is equal to [1, 5, $\infty$, $\infty$]. Similarly, Edge CD 807 is traversed by the first circuit 902 and the third circuit 906. As shown in FIG. 4B, the corresponding total path cost arrays 3001 and 3201 for these circuits are [0, 4, 0, 0] and [0, 2, 0, 0], respectively, with frequency slots 1 and 3 being unavailable. Accordingly, the final edge cost array 824 for Edge CD 807 is [$\infty$, 6, $\infty$, 0].

After final edge cost arrays are calculated for all relevant edges, end-to-end costs are calculated for the paths identified for a new circuit. The end-to-end path costs are calculated for each frequency slot in the spectrum along the respective paths. The costs are determined, in some implementations, by summing the final edge cost arrays of the edges that make the up the respective paths. Consider, for example, a new circuit to be added between Node A 702 and Node D 708. Assume, at stage 804, the controller 330 identifies as potential paths between Node A 702 and Node D 708 the two paths:

Path 1: Node A→Node B→Node C→Node D; and
Path 2: Node A→Node B→Node D.

The total path cost for Path 1 would be [1, 5, $\infty$, $\infty$]+[1, 5, $\infty$, 1]+[$-\infty$, 6, $-\infty$, 0]=[$\infty$, 16, $-\infty$, $-\infty$]. The total path cost for Path 2 would be [1, 5, $-\infty$, $-\infty$]+[0, 0, 0, 0]=[1, 5, $-\infty$, $-\infty$].

After the end-to-end costs for possible paths for new circuit(s) are calculated (stage 406), new circuits are allocated along respective paths at respective frequency slots based on the calculated costs (stage 408). Circuits may be allocated by the circuit allocation module 370 of the routing and spectrum allocation engine 342 of the controller 330 shown in FIG. 2. In the simplest scenario, in which a single circuit is being allocated, and the circuit carries a sufficiently small amount of data to require only one frequency slot, this stage involves selecting the path and frequency slot for the circuit with the lowest end-to-end cost. For example, for the circuit connecting Node A 702 to Node D 708 discussed above, the circuit would be allocated to frequency slot 1 over Path 2, as its end-to-end cost would be 1, whereas the end-to-end cost of using frequency slot 2 over Path 2 would be 5, and the end-to-end cost of using frequency slot 2 over Path 1 would be 16.

The circuit allocation stage 408 may be more complicated when a circuit requires multiple frequency slots allocated. Preferably, though not required, in such situations, the frequency slots are allocated in a contiguous fashion, so that the sum of costs across the contiguous frequency slots is minimized. In some implementations, if all allocated slots correspond to single optical carrier, then the allocated slots are allocated contiguously. For example, if the above discussed circuit required the allocation of two frequency slots, the circuit would be allocated to frequency slots 1 and 2 of Path 2. In still some other implementations, in which the bandwidth of different frequency slots may vary, it should be noted that selection of some paths, depending on frequency slot availability, may require allocation of a different number of frequency slots than selection of a different path. To select a path in such situations, the total costs across each respective number of frequency slots is taken into account.

The circuit allocation stage 408 may also be complicated if multiple circuits have been identified for allocation at the same time. If the number of circuits to be allocated is small (e.g., less than 100), several options for allocation exist. In one example, the process is carried out for one circuit at a time, in order of circuit length. As any circuit may be allocated paths of varying lengths, suitable circuit length metrics that may be used for ordering the circuit allocation process may be the minimum, mean, median, or maximum path length of the set of possible paths identified for each circuit at stage 404. After a given circuit is allocated, the costs associated with each edge is updated before a subsequent circuit is allocated (stage 410).

In another implementation, an optimization process may be utilized to find an minimum (or lower) total cost allocation of all circuits to be allocated. If the number of circuits to be allocated is small enough (given the computing resources available), the optimization process may include an exhaustive search, attempting to allocate channels in each possible order. If larger numbers of circuits are to be allocated at once, a more complex optimization process, for example, employing linear programming, may be used to obtain an improved circuit allocation result.

Upon allocating a circuit to a given path and frequency slot, the circuit allocation module 370 causes the controller to communicate instructions to the source node of the new circuit to transmit the data associated with the new circuit over the selected frequency via the output port coupled to the next node in the path selected for the new circuit. The routing and spectrum allocation engine 342 can also optionally update the costs associated with allocating a new circuit to the edges impacted by the allocation of the new circuit to expedite allocation of future circuits (stage 410).

As discussed above, the above process includes calculating the costs for all edges in the network prior to allocating a new circuit on the network. However, as suggested above, in other implementations, instead of pre-computing edge costs for all edges in the entire network prior to placing a new circuit, only the cost of all affected edges associated with a new circuit at the time of adding the new circuit is calculated. In this ad-hoc cost computation method, the costs of all edges may not need to be updated after adding the new circuit. Instead, in some implementations of the ad hoc computation method, only the costs of the edges including the new circuit are updated. Similarly, when removing a circuit, only the edges included in the removed circuit are adjusted. In some implementations of the ad hoc computation method, the costs are not updated on the fly, continuously.

FIG. 6 is a block diagram illustrating a general architecture for a computer system 1000 that may be employed to implement elements of the systems and methods described and illustrated herein, according to an illustrative implementation.

In broad overview, the computing system 1010 includes at least one processor 1050 for performing actions in accordance with instructions and one or more memory devices 1070 or 1075 for storing instructions and data. The illustrated example computing system 1010 includes one or more processors 1050 in communication, via a bus 1015, with at least one network interface driver controller 1020 with one or more network interface cards 1022 connecting to one or more network devices 1024, memory 1070, and any other devices 1080, e.g., an I/O interface. The network interface card 1022 may have one or more network interface driver ports to communicate with the connected devices or components. Generally, a processor 1050 will execute instructions received from memory. The processor 1050 illustrated incorporates, or is directly connected to, cache memory 1075.

In more detail, the processor 1050 may be any logic circuitry that processes instructions, e.g., instructions fetched from the memory 1070 or cache 1075. In many embodiments, the processor 1050 is a microprocessor unit or special purpose processor. The computing device 1000 may be based on any processor, or set of processors, capable of operating as described herein. The processor 1050 may be a single core or multi-core processor. The processor 1050 may be multiple processors. In some implementations, the processor 1050 can be configured to run multi-threaded operations. In some implementations, the processor 1050 may host one or more virtual machines or containers, along with a hypervisor or container manager for managing the operation of the virtual machines or containers. In such implementations, the methods shown in FIG. 3 can be implemented within the virtualized or containerized environments provided on the processor 1050.

The memory 1070 may be any device suitable for storing computer readable data. The memory 1070 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 1000 may have any number of memory devices 1070. In some implementations, the memory 1070 supports virtualized or containerized memory accessible by virtual machine or container execution environments provided by the computing system 1010.

The cache memory 1075 is generally a form of computer memory placed in close proximity to the processor 1050 for fast read times. In some implementations, the cache memory 1075 is part of, or on the same chip as, the processor 1050.

In some implementations, there are multiple levels of cache 1075, e.g., L2 and L3 cache layers.

The network interface driver controller 1020 manages data exchanges via the network interface driver 1022 (also referred to as network interface driver ports). The network interface driver controller 1020 handles the physical and data link layers of the OSI model for network communication. In some implementations, some of the network interface driver controller's tasks are handled by the processor 1050. In some implementations, the network interface driver controller 1020 is part of the processor 1050. In some implementations, a computing system 1010 has multiple network interface driver controllers 1020. The network interface driver ports configured in the network interface card 1022 are connection points for physical network links. In some implementations, the network interface controller 1020 supports wireless network connections and an interface port associated with the network interface card 1022 is a wireless receiver/transmitter. Generally, a computing device 1010 exchanges data with other network devices 1024 via physical or wireless links that interface with network interface driver ports configured in the network interface card 1022. In some implementations, the network interface controller 1020 implements a network protocol such as Ethernet.

The other network devices 1024 are connected to the computing device 1010 via a network interface driver port included in the network interface card 1022. The other network devices 1024 may be peer computing devices, network devices, or any other computing device with network functionality. For example, a first network device 1024 may be a network device such as a hub, a bridge, a switch, or a router, connecting the computing device 1010 to a data network such as the Internet.

The other devices 1080 may include an I/O interface, external serial device ports, and any additional co-processors. For example, a computing system 1010 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 1000 includes an additional device 1080 such as a coprocessor, e.g., a math co-processor can assist the processor 1050 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A computer-implemented method, comprising:
   identifying a new circuit to be added to a mesh optical network having a plurality of optical links, each optical circuit including a source node and a destination node between which an optical signal carried over the optical circuit is not converted to an electrical signal;
   identifying a set of potential paths for the new circuit through the mesh optical network;
   for each optical link in each identified potential path, determining respective costs for a plurality of frequency slots of allocating the new circuit to a potential path including the optical link, wherein the cost of allocating a given frequency slot on a given optical link is determined in part based on the lengths of optical circuits that can traverse the given optical link using that frequency slot;
   calculating total cost values for allocating available frequency slots over each of the identified potential paths for the new circuit based on the costs determined for the frequency slots for each optical link along the potential paths;
   selecting one of the identified potential paths and one or more of the available frequency slots for the new circuit based on the calculated total cost values; and
   communicating routing and spectrum allocation instructions based on the selected path and the selected one or more frequency slots to a plurality of nodes in the network to implement the new circuit.

2. The method of claim 1, wherein selecting one or more of the available frequency slots for the new circuit comprises selecting a plurality of adjacent frequency slots.

3. The method of claim 1, wherein selecting one of the potential paths and the one or more frequency slots includes selecting the one or more frequency slot over the potential paths that have the lowest calculated total cost value.

4. The method of claim 1, further comprising assigning a higher cost to frequency slots that are available for longer optical circuits and a lower cost to frequency slots that are only available for shorter optical circuits.

5. The method of claim 1, wherein the cost of allocating one frequency slot over a given optical link to a new circuit differs from the cost of allocating a different frequency slot over the given optical to the new circuit based on the locations of the frequency slots in the electromagnetic spectrum.

6. The method of claim 1, comprising, after selecting one of the identified potential paths and one or more of the available frequency slots for the new circuit based on the calculated total cost values, calculating updated costs for frequency slots over a plurality of optical links in the optical mesh network based on the selection.

7. The method of claim 6, wherein the updated costs are calculated only for links included in the selected identified potential paths.

8. The method of claim 1, wherein identifying a set of potential paths further comprises identifying a subset of paths having a path length within a configured percentage of a smallest path length identified between the source node and the destination node, wherein path length is measured in terms of total optical fiber length along the respective paths.

9. A non-transitory computer-readable medium storing instructions that, when executed by one or more processors, cause the one or more processors to:
   identify a new circuit to be added to a mesh optical network having a plurality of optical links, each optical circuit including a source node and a destination node between which an optical signal carried over the optical circuit is not converted to an electrical signal;
   identify a set of potential paths for the new circuit through the mesh optical network;
   for each optical link in each identified potential path, determine respective costs for a plurality of frequency slots of allocating the new circuit to a potential path including the optical link, wherein the cost of allocating a given frequency slot on a given optical link is determined in part based on the lengths of optical circuits that can traverse the given optical link using that frequency slot;
   calculate total cost values for allocating available frequency slots over each of the identified potential paths for the new circuit based on the costs determined for the frequency slots for each optical link along the potential paths;
   select one of the identified potential paths and one or more of the available frequency slots for the new circuit based on the calculated total cost values; and
   communicate routing and spectrum allocation instructions based on the selected path and the selected one or more frequency slots to a plurality of nodes in the network to implement the new circuit.

10. The computer-readable medium of claim 9, wherein selecting one or more of the available frequency slots for the new circuit comprises selecting a plurality of adjacent frequency slots.

11. The computer-readable medium of claim 9, wherein selecting one of the potential paths and the one or more frequency slots includes selecting the one or more frequency slot over the potential paths that have the lowest calculated total cost value.

12. The computer-readable medium of claim 9, wherein the one or more processors assign a higher cost to frequency slots that are available for longer optical circuits and a lower cost to frequency slots that are only available for shorter optical circuits.

13. The computer-readable medium of claim 9, wherein the cost of allocating one frequency slot over a given optical link to a new circuit differs from the cost of allocating a different frequency slot over the given optical to the new circuit based on the locations of the frequency slots in the electromagnetic spectrum.

14. The computer-readable medium of claim 9, storing instructions that, when executed by the one or more processors, cause the one or more processors to, after selecting one of the identified potential paths and one or more of the available frequency slots for the new circuit based on the calculated total cost values, calculate updated costs for frequency slots over a plurality of optical links in the optical mesh network based on the selection.

15. The computer-readable medium of claim 14, wherein the updated costs are calculated only for links included in the selected identified potential paths.

16. A system comprising:
  an optical mesh network including a plurality of nodes interconnected by optical links;
  a memory for storing a representation of the optical mesh network; and
  a processor configured to:
   identify a new circuit to be added to a mesh optical network having a plurality of optical links, each optical circuit including a source node and a destination node between which an optical signal carried over the optical circuit is not converted to an electrical signal;
   identify a set of potential paths for the new circuit through the mesh optical network based on the stored representation;
   for each optical link in each identified potential path, determine respective costs for a plurality of frequency slots of allocating the new circuit to a potential path including the optical link, wherein the cost of allocating a given frequency slot on a given optical link is determined in part based on the lengths of optical circuits that can traverse the given optical link using that frequency slot;
   calculate total cost values for allocating available frequency slots over each of the identified potential paths for the new circuit based on the costs determined for the frequency slots for each optical link along the potential paths;
   select one of the identified potential paths and one or more of the available frequency slots for the new circuit based on the calculated total cost values; and
   communicate routing and spectrum allocation instructions based on the selected path and the selected one or more frequency slots to a plurality of nodes in the network to implement the new circuit.

17. The system of claim 16, wherein selecting one or more of the available frequency slots for the new circuit comprises selecting a plurality of adjacent frequency slots.

18. The system of claim 16, wherein the processor is configured to assign a higher cost to frequency slots that are available for longer circuits and a lower cost to frequency slots that are only available for shorter circuits.

19. The system of claim 16, wherein the cost of allocating one frequency slot over a given optical link to a new circuit differs from the cost of allocating a different frequency slot over the given optical to the new circuit based on the locations of the frequency slots in the electromagnetic spectrum.

20. The system of claim 16, wherein the processor is configured to, after selecting one of the identified potential paths and one or more of the available frequency slots for the new circuit based on the calculated total cost values, calculate updated costs for frequency slots over a plurality of optical links in the optical mesh network based on the selection.

* * * * *